Patented July 29, 1947

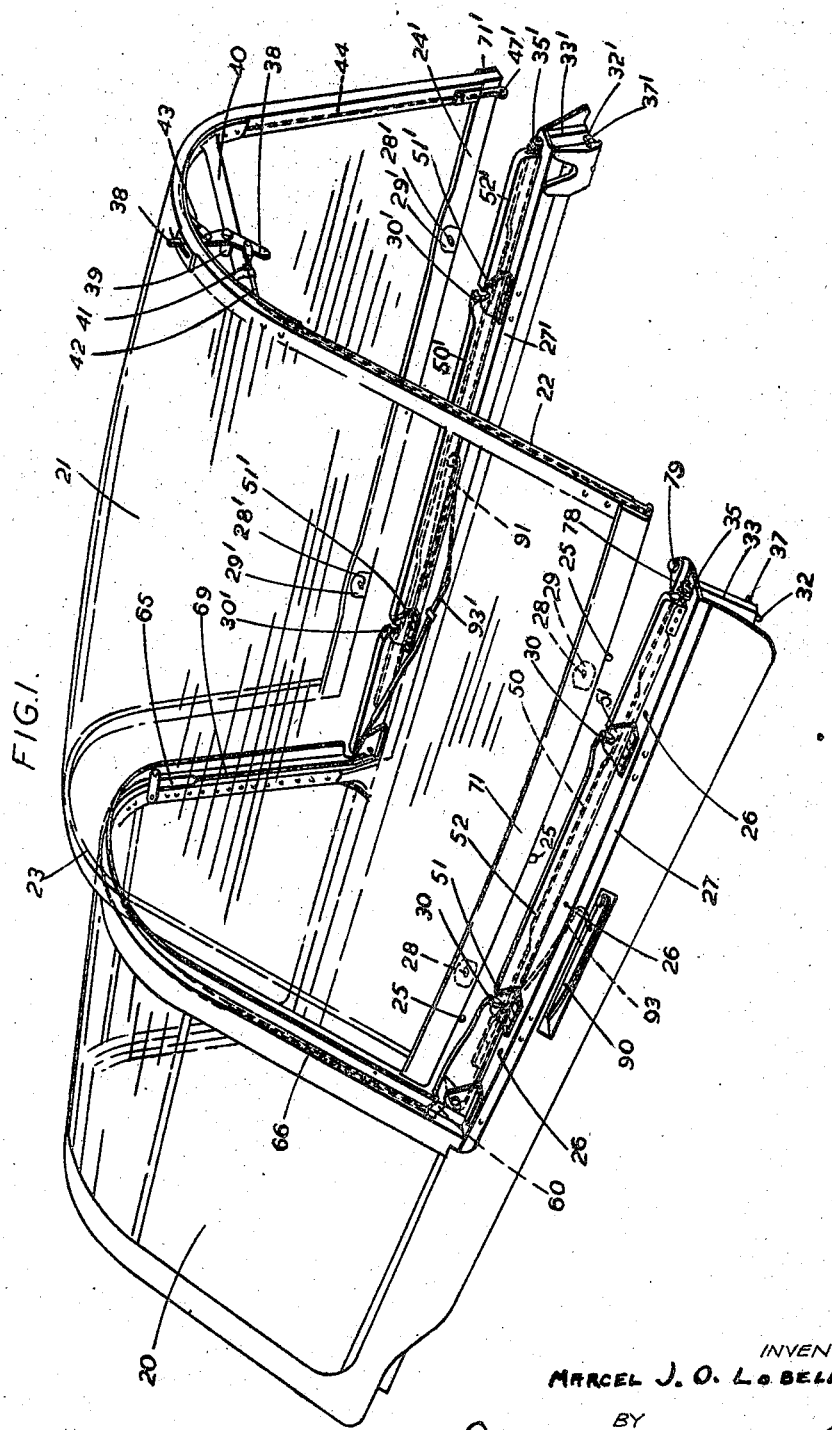

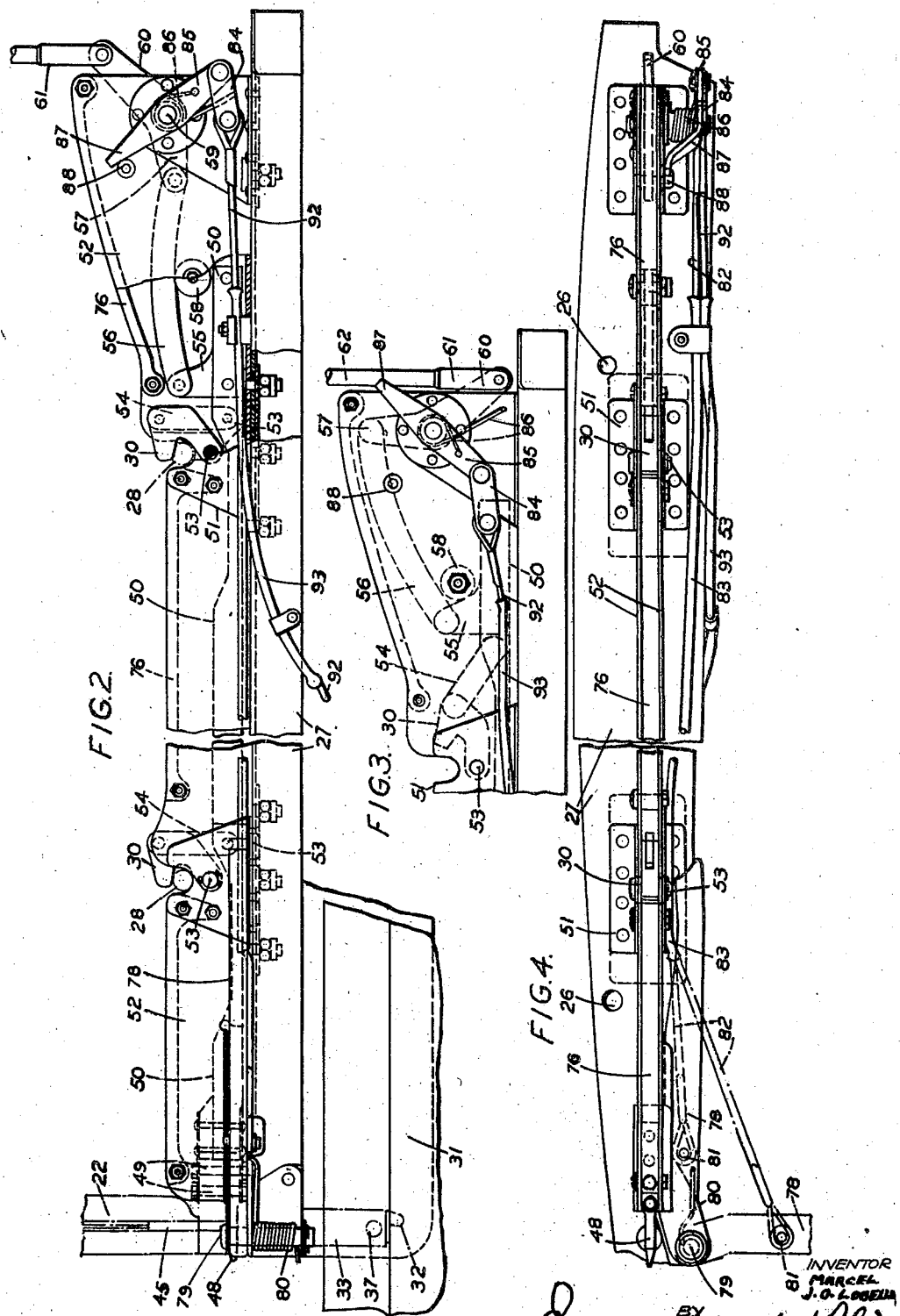

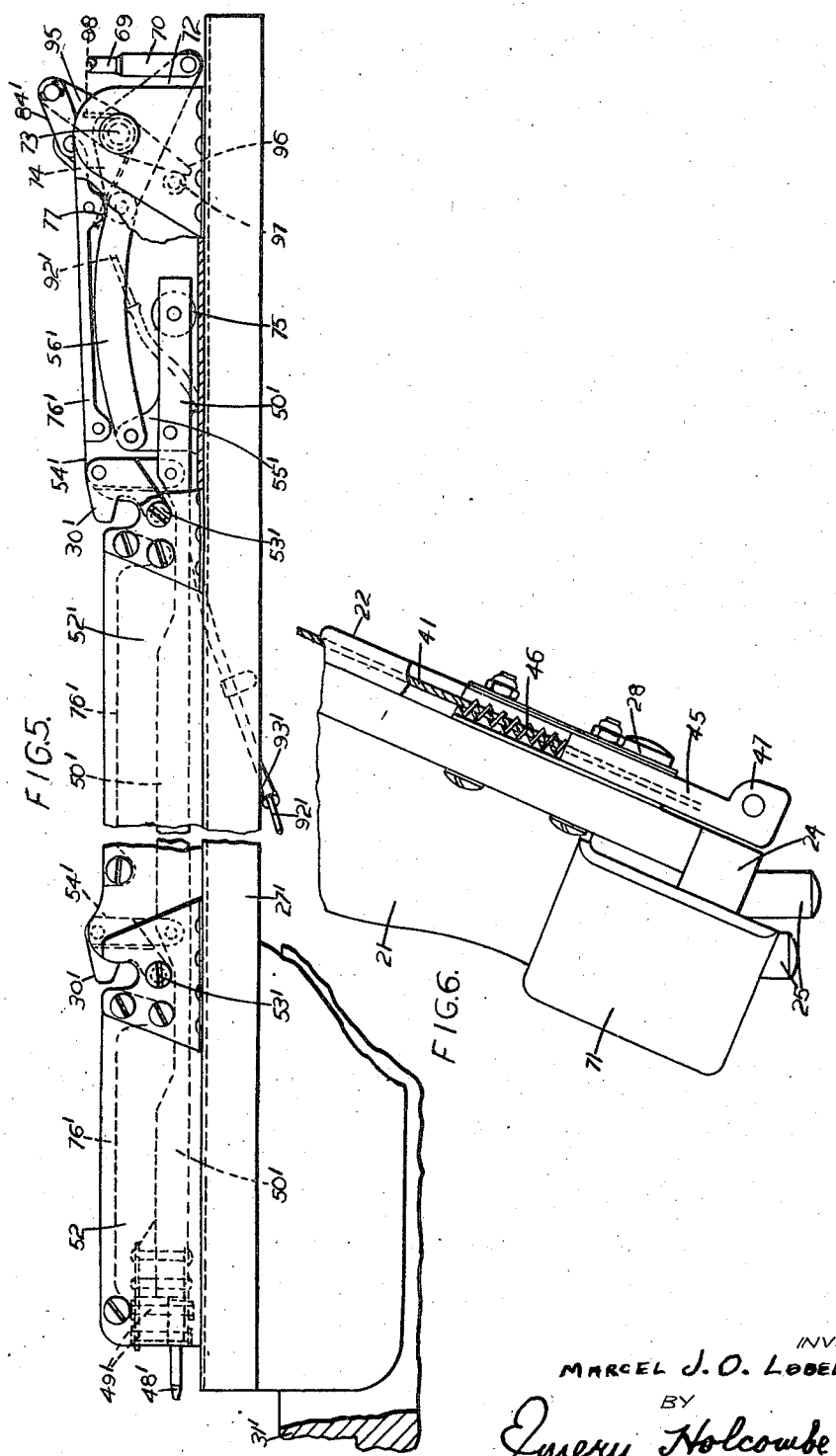

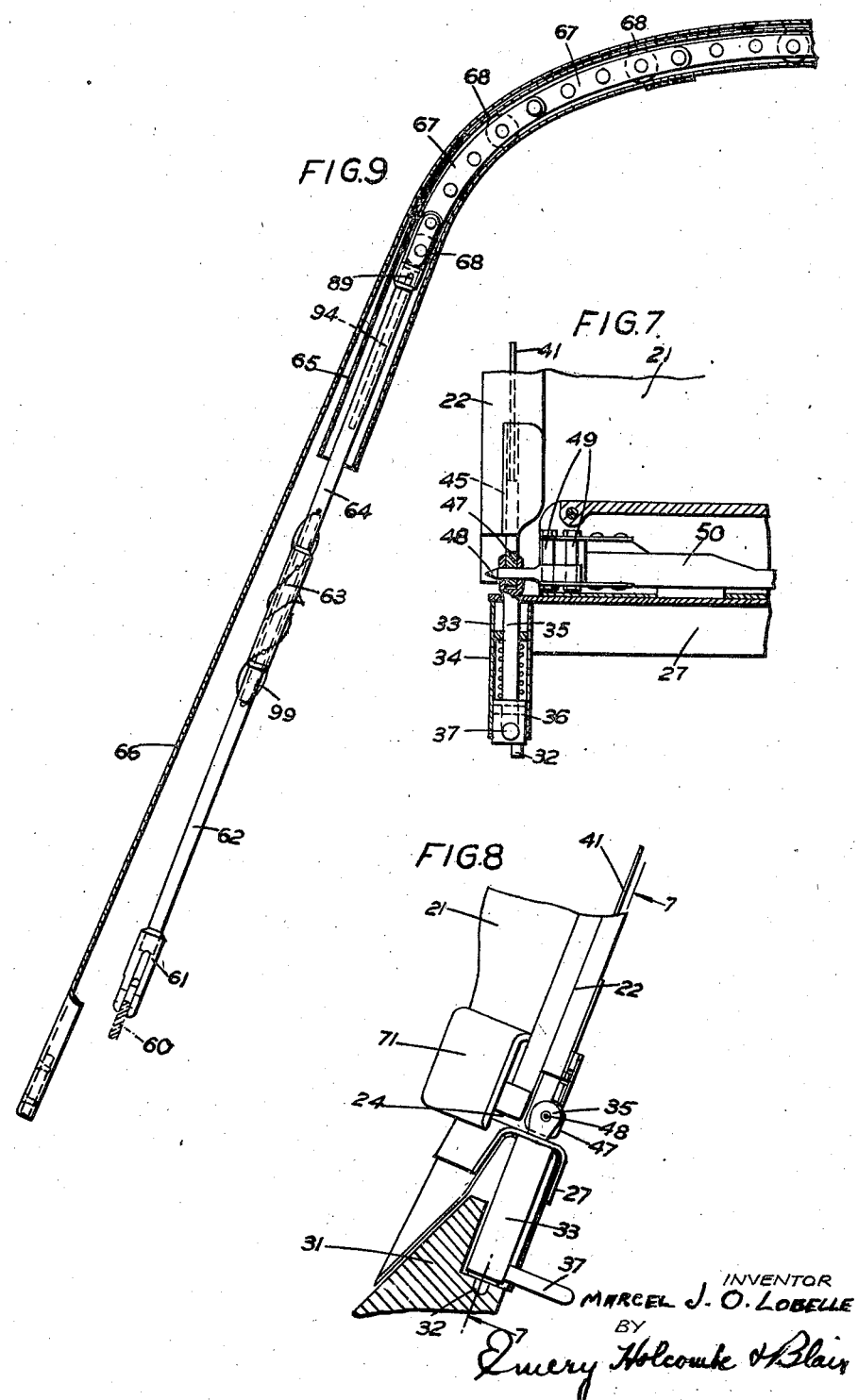

2,424,834

UNITED STATES PATENT OFFICE 2,424,834

SLIDABLE AND RELEASABLE HOOD FOR AIRCRAFT

Marcel Jules Odilon Lobelle, Slough, England, assignor to Messrs. R. Malcolm Limited, Slough, England, a British company Application April 25, 1945, Serial No. 590,290
In Great Britain April 25, 1944

6 Claims. (Cl. 244—121)

This invention relates to sliding hoods for aircraft of the type in which a release can be effected in case of emergency so as to provide a clear space for the escape of the pilot. Hoods for fighter aircraft which can normally slide back and forth so as to close the cockpit or open it to any required extent are already known, and in these the complete hood can be jettisoned in emergency by releasing its sliding connections to the fuselage. The present invention relates to sliding hoods of a larger type in which it is undesirable to release the whole of the sliding hood in emergency because of its heavy weight, and it is sufficient to release only a portion of it which may be called the canopy. What is required therefore is a hood which will normally slide back and forth as a whole to any extent required, and which has one canopy section, say at the front, which can be separately released in emergency in any position of the sliding hood.

The principal object of the invention is to provide a sliding hood for aircraft with a detachable canopy which can be released at will by the pilot at any time, but will normally partake of the sliding movements of the hood as a whole, and for this purpose to provide releasable attachments at each side of the sliding hood and means for transmitting the motion of a releasing device from one side of the sliding hood to the other.

Another object is to provide a sliding hood for aircraft with a detachable canopy, means for securing the canopy in the form of pegs engaging in slots and locked by claws, and mechanism for transmitting a releasing movement simultaneously to the claws on both sides of the hood through connections extending through the arch of the hood.

A further object is to provide a sliding hood for aircraft with a detachable canopy, means for locking and for releasing the canopy, latch bolts for securing the sliding hood in positions of adjustment, and operating mechanism for said latch bolts on the canopy with connections which will be released automatically when the means for locking and releasing the canopy are actuated to effect release thereof.

With these and other objects in view the invention comprises the novel features hereinafter pointed out and defined by the claims.

The invention is illustrated by way of example in the accompanying drawings, wherein:

Figure 1 is a perspective view of the hood and canopy showing the canopy detached from the hood;

Figure 2 is a side elevation of the locking and releasing mechanism for the canopy on the starboard side of the hood;

Figure 3 shows part of the mechanism of Figure 2 in the releasing position;

Figure 4 shows the mechanism of Figure 2 in plan view;

Figure 5 is a similar view to Figure 2, but viewed from the outside, showing the locking and releasing mechanism for the canopy on the port side of the hood;

Figure 6 shows an enlarged detail view of the front corner of the canopy on the starboard side;

Figure 7 is a detail view partly in section of the latch bolt mechanism at the starboard side of the hood, taken on the line 7—7 of Figure 8;

Figure 8 is an end view of the latch bolt mechanism at the starboard side; and

Figure 9 is a view, partly in section, showing part of the hood with the operating mechanism carried within it, as seen from the front.

Referring to the drawings, the part of the sliding hood which is not detachable is marked 20, and the releasable canopy is marked 21. The canopy 21 may be of a transparent plastic material with stiffening arches 22 and 23 at the front and back, and longitudinal base strips of the same transparent material cemented to the edges of the canopy for retaining it in the outboard side members 71, 71$^1$, these in turn being secured to the inboard side members 24, 24$^1$ by screws. The inboard side members extend under the edges of the transparent canopy 21 to form a base. The parts at the starboard side are marked with the plain numerals, and corresponding parts at the port side with dashed numerals as 24$^1$, 25$^1$ and so on. It will suffice to refer first to the parts at the starboard side, Figures 1 and 2 to 4. The base member 24 has downwardly projecting dowel pins 25 for engaging in holes marked at 26 in the side rail 27 of the hood proper, and inwardly projecting pegs 28 mounted in and located by plates 29 fixed to the side of the base members 24. These pegs 28 are engaged by claws 30 on the side rail 27 as described below, in order to provide the releasable connection between the canopy 21 and the hood 20.

The side rails 27 and 27$^1$ of the hood proper slide longitudinally in the usual manner along fixed guides 31, 31$^1$ at each side of the fuselage, as shown in Figs. 5, 7 and 8, and can be locked in any of several positions of adjustment by latch bolts 32, 32$^1$ at the front ends of the side rails 27, 27$^1$. The latch bolt 32 slides in a box 33 as seen in Fig. 7, and is pressed downwardly by a spring 34 surrounding a rod 35 connected by a pin 36 to the body of the latch bolt. For lifting the latch bolt directly by hand if required an inwardly projecting pin 37 is provided. The latch bolts at the two sides of the hood are normally operated simultaneously by a single lever 38 at the top of the canopy and at the front thereof. This lever 38 is pivoted on a bracket 39 secured to a transverse tubular stay 40, and has one arm projecting down for operation by the pilot, and another arm projecting through a slot in the front arch 22 of the canopy, for operation from outuside when required. The lower arm of lever 38 is linked to a cable 41 extending down inside the arch stiffener 22 at one side of the canopy, and the other arm is linked to a cable 43 extending through a tube 44 to the other side of the canopy, the cables serving in each case to operate slides 45 for lifting the latch bolts 32, 32¹. The mechanism at the end of cable 41 is shown in Figure 6 where it is seen that the cable is attached to a slide 45 pressed down by a spring 46, and terminating in an eye 47. A coupling pin 48 which can slide up and down on guides 49 at the front end of a sliding rod 50 serves to connect the eye end 47 of the slide 45 with the eye at the top of the rod 35. The guides 49 allow the coupling pin 48 to rise and fall as the lever 38 is operated to lift and lower the latch bolt 32, but when the sliding rod 50 is pulled back for releasing the claws 30 as described below, the coupling pin 48 is withdrawn so releasing the operative connection between the latch bolt 32 and the lever 38 allowing the canopy to be jettisoned freely. The same occurs of course in the case of the latch bolt 32¹ at the port side. After the canopy has been jettisoned the latch bolts can be operated if required by their projecting pins 37, 37¹.

Considering first the starboard side of the hood and canopy, Figures 2, 3 and 4, the pegs 28 on the canopy project through slots in lugs 51 and in channel members 52 which form the sides of a box-like structure mounted on the side rail 27 of the sliding hood, the pegs being engaged by the claws 30. Each claw is pivoted on a stud 53 between channel members 52 and connected by a link 54 to the sliding rod 50 which normally holds the claws in an upright position, as shown in Figures 2 and 4. The rod 50 carries a bracket 55 to which is connected a link 56 whose other end is pivotally connected to the arm 57 of a lever mounted on a spindle 59. The spindle 59 is supported to turn in bearings in the channel members 52. The rod 50 extends under a roller 58 which acts as a guide for the end of the rod and also as a stop to limit its endwise movement when the bracket 55 comes against said roller. The roller 58 also acts as a stop to prevent the link 56 from descending too far, as seen in Figure 2, so that the link 56 and lever 57 may act as a toggle. The lever 57 has another arm 60 projecting backwards and connected to a fork 61 in the end of an operating connection extending beneath the arch of the hood 20 to the other side of this latter for operating simultaneously the claws 30¹ on the port side of the hood. This connection is rendered necessary because no cross shaft or mechanical linkage across the hood at the level of the side rails 27 and 27¹ is permissible. As shown in Figure 9, the fork 61 is on the end of a rod 62 with a turnbuckle 63 connecting it to rod 64, whose other end projects into a conduit 65 extending under the reinforcing arch 66 of the hood 20. The top of rod 64 has a head with a pin 89 projecting from it into a slot at 94 in the conduit 65, which prevents the rod 64 from tending to turn in the conduit. The head of rod 64 is linked to a set of connected links 67 with rollers 68 upon them forming a chain extending through the conduit 65, and adapted to transmit a thrust or a pull through the conduit to a rod 69, Figure 5, at the other side of the hood. This rod ends in a forked member 70 for connection to the lever 72 of the operating mechanism for the claws 30¹ at the port side of the hood. The lever 72 is mounted on a spindle 73 between the channel members 52¹ and has an arm 74 connected by a link 56¹ to a bracket 55¹ on the rod 50¹. The end of the rod 50¹ carries a roller 75 arranged to run on the bottom of the support between the channel members 52¹ so as to reduce frictional resistance to movement. The rod 50¹ is connected to the claws 30¹ by links 54¹. The turnbuckle 63, Figure 9, when adjusted so that the claws 30 and 30¹ are released simultaneously, may be locked in its position of adjustment by a wire 99 threaded through holes bored in the turnbuckle and the rods 62 and 64. The mechanism shown in Figure 5 for operating the claws 30¹ is similar to that on the starboard side except that the lever 72 for operating the rod 50¹ is reversed in position so that it moves upwardly for drawing back the rod 50¹, whereas the lever arm 60 moves downwardly when its rod 50 moves backwards.

The spaces between the channel members 52 and 52¹ at each side of the hood are closed at the top by covers 76 and 76¹ except where the claws 30 and 30¹ project and at the ends where the levers 60 and 72 operate.

It is necessary to provide convenient means for operating the releasing mechanism of the canopy by the pilot and also preferably by a person approaching the hood from either side. In the construction shown in Figures 1, 2 and 4 the pilot's operating mechanism consists of a hand lever 78 pivotally mounted on a pin 79 at the forward end of the side rail 27, and normally held in the position shown by a coiled spring 80. The hand lever has a pin 81 passing through it for the attachment of one end of a cable 82 which is carried through a tubular guide 83 to the end of the side rail where the lever 57, 60 is mounted. The other end of cable 82 carries a link 84 connecting it to lever arm 85 on the inner end of the spindle 59. A coiled spring 86 normally holds the lever 85 with spindle 59 and lever arms 57 and 60 thereon in the position shown in Figures 2 and 4, while an arm 87 of lever 85 rests against a stop 88. For disengaging the claws 30 and 30¹ the pilot must get his fingers behind the end of hand lever 78 to pull it out a little until he can seize it by hand and press it forwards towards the position indicated in dotted lines in Figure 4. In this movement the cable 82 pulls upon lever 85 turning the spindle 59 and drawing back the rod 50 by the link 56 and lever arm 57 as indicated in Figure 3, whereby the rod 50 is drawn back and both claws 30 are released from the pegs 28. Simultaneously the rod 50¹ at the port side of the hood is drawn back through the rods and links 62, 63, 64, 69 raising lever 72, releasing the claws 30¹ from the pegs 28¹ at that side. The canopy is thus released, and, if the aircraft is in flight, the air flow will lift the canopy clear of the aircraft, thus causing the canopy to be jettisoned.

The provision for operating this releasing mechanism from outside the hood consists of hand levers 90 and 91 mounted in the frame of the non-releasable part of the sliding hood 20 at the starboard and port sides respectively of the hood. The hand lever 90 has an attachment to the end of a cable 92 extending through a tubular guide 93 and connected by the link 84 to the same lever 85 as is operated by cable 82. At the port side of the hood the lever 91 has an attachment to the end of cable $92^1$ extending through tubular guide $93^1$ to the link $84^1$ connecting the cable to a lever 95 on spindle 73, while another arm 96 of this lever normally bears against a stop 97 under the action of a spring 98. When either of the levers 90 or 91 is operated it thus causes the release mechanism for the claws at the two sides of the hood to be actuated through the link connection in the conduit 66 extending through the arch of the hood, releasing the claws holding the canopy at both sides.

The turnbuckle 63 enables the operative length of the linkage connecting the lever arms 60 and 72 to be adjusted with accuracy so enabling the mechanism to be set for releasing both sides of the canopy 21 at the same moment. It will be seen that the link 56 and lever arm 57 on the starboard side, and the link $56^1$ with lever arm 74 on the port side, form toggles when the claws 30, $30^1$ are in locking engagement with the pegs 28, $28^1$, resisting any unintentional release of the claws but readily moving to effect such release when the lever arms 57 and 74 are turned by manipulation of one of the hand levers 78, 90 or 91. The toggles are prevented from moving too far beyond the straight line position by stops provided by the roller 58, Figure 2, as already mentioned, and by projection 77 on the cover $76^1$, Figure 5. An indication that the releasing mechanism is in the locked position is provided by noticing that the lever arm 87 is against stop 88, and lever arm 96 is against stop 97.

Although the canopy has been described as being held down by two pegs engaged by two claws at each side, it will be evident that it might have more than two pegs and claws at each side if found desirable. It may also have any number of downwardly projecting pins engaging in holes in the side rails of of the sliding hood which will locate the edges of the canopy in the side rails of the hood provided the claws are in engagement with the inwardly projecting pegs.

I claim:

1. A sliding hood structure for aircraft comprising a hood proper and a pair of side rails therefor, said hood proper extending over part only of the length of said side rails, a canopy and means detachably connecting said canopy to said side rails in continuation of said hood proper, said means of detachable connection comprising base members along each side of said canopy, downwardly extending pins thereon adapted to engage recesses in said side rails, laterally extending pegs on said base members, upstanding members on each of said side rails with slots therein adapted to receive said pegs when said pins are in engagement with said recesses, claws adapted to hold said pegs in said slots, operating mechanism for said claws on each of said side rails, linkage extending within said hood proper from side to side thereof connecting the said operating mechanism on one of said side rails to that on the other, a hand lever and an operative connection from said hand lever to the operating mechanism on one of said side rails.

2. A sliding hood structure for aircraft comprising a hood proper and a pair of side rails therefor, said hood proper extending over part only of the length of said rails, a canopy and means detachably connecting said canopy to said side rails in continuation of said hood proper, means for slidably supporting said side rails on an aircraft, latch bolts on said side rails adapted to engage recesses in said supporting means for said side rails, an operating lever on said canopy and means of connection between said operating lever and each of the said latch bolts on said side rails, said means of connection including pin elements associated with said means for detachably connecting said canopy to said side rails such that the said pin elements are disconnected automatically on release of said canopy.

3. A sliding hood structure for aircraft comprising a hood proper and a pair of side rails therefor, said hood proper extending over part only of the length of said side rails, a canopy and means detachably connecting said canopy to said side rails in continuation of said hood proper, said means of detachable connection including bars adapted to slide longitudinally on said side rails between positions respectively securing and releasing said canopy, means for slidably supporting said side rails on an aircraft, latch bolts on said side rails adapted to engage recesses in said supporting means for said side rails, an operating lever on said canopy, mechanical connections between said operating lever and each of said latch bolts, said mechanical connections including pins carried by said bars and arranged to complete said connections when said bars are in canopy securing position and to be withdrawn when said bars are slid longitudinally toward their position for releasing said canopy.

4. A sliding hood structure for aircraft comprising a hood proper and a pair of side rails therefor, said hood proper extending over part only of the length of said side rails, a canopy and means detachably connecting said canopy to said side rails in continuation of said hood proper, said means of detachable connection including bars adapted to slide longitudinally on said side rails for releasing said canopy, means for slidably supporting said side rails on an aircraft, latch bolts on said side rails adapted to engage recesses in said supporting means for said side rails, an operating lever on said canopy, having one arm extending within said canopy and another arm extending outside said canopy, slide members and means for guiding the same one on each side of said canopy, linkage connecting said slide members to said lever, a pin and an eyelet forming a connector between each such slide member and one of said latch bolts, and means for guiding said pins on the bars which slide on said side rails, said guiding means permitting relative movements between said pins and bars only in the direction required for operating said latch bolts.

5. A sliding hood structure for aircraft comprising a hood proper and a pair of side rails connected thereto, said hood proper extending over part only of the length of said side rails, a canopy and means detachably connecting said canopy to said side rails in continuation of said hood proper, said means of detachable connection comprising projections on said canopy, claws on said side rails for engagement with said projections, a hand lever, and mechanism operatively connecting said hand lever to said claws on both of said side rails, a latch bolt on each side rail, a lever on said canopy, and operative connections between said lever and each latch bolt, said operative connections including connecting pins and means adapted to withdraw said pins and to interrupt said connections when said claws are moved in a direction to disengage them from the projections on said canopy.

6. A sliding hood structure for aircraft comprising a hood proper and a pair of side rails connected thereto and extending beyond said hood proper, a canopy and means detachably connecting said canopy to said side rails in continuation of said hood proper, said means of detachable connection comprising pegs on said canopy, upstanding projections on said side rails with slots therein for receiving said pegs, claws adapted to hold said pegs in the slots of said upstanding projections, operating mechanism for the claws on each side rail, linkage within said hood proper connecting the operating mechanism on the two side rails, and manual releasing means both inside and outside said hood adapted to actuate said operating mechanism for drawing back said claws out of engagement with said pegs.

MARCEL JULES ODILON LOBELLE.

REFERENCES CITED

The following references are of record in the file of this patent:

UNITED STATES PATENTS

| Number | Name | Date |
|---|---|---|
| 2,125,752 | Saulnier | Aug. 2, 1938 |
| 2,361,113 | Lobelle | Oct. 24, 1944 |
| 2,385,493 | Bowers | Sept. 25, 1945 |

FOREIGN PATENTS

| Number | Country | Date |
|---|---|---|
| 472,366 | Great Britain | Sept. 22, 1937 |
| 544,571 | Great Britain | Apr. 17, 1942 |